US 7,076,249 B2

(12) United States Patent
Svedevall et al.

(10) Patent No.: US 7,076,249 B2
(45) Date of Patent: Jul. 11, 2006

(54) METHOD AND APPARATUS FOR GENERATING MANAGEMENT DATA FOR DRIFTING MOBILE RADIOS

(75) Inventors: Sofia Svedevall, Linköping (SE); Bengt Carlsson, Linköping (SE); Stefan Johansson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 520 days.

(21) Appl. No.: 10/138,523

(22) Filed: May 6, 2002

(65) Prior Publication Data

US 2003/0207687 A1 Nov. 6, 2003

(51) Int. Cl.
   *H04Q 7/20* (2006.01)
(52) U.S. Cl. .................. 455/436; 455/439; 455/446; 455/560; 370/331
(58) Field of Classification Search ........ 455/436–444, 455/453, 446, 422.1, 560, 561; 370/310, 370/310.2, 331, 332, 351, 352
   See application file for complete search history.

(56) References Cited

U.S. PATENT DOCUMENTS

| 6,131,030 | A * | 10/2000 | Schon et al. ................ 455/438 |
| 6,256,300 | B1 * | 7/2001 | Ahmed et al. ............... 370/331 |
| 6,807,421 | B1 * | 10/2004 | Ahmavaara ................. 455/438 |
| 6,832,086 | B1 * | 12/2004 | Powers et al. ............... 455/423 |
| 2002/0160777 | A1 * | 10/2002 | Takao et al. ................. 455/436 |
| 2003/0013443 | A1 * | 1/2003 | Willars et al. ............... 455/432 |
| 2004/0053630 | A1 * | 3/2004 | Ramos et al. ............... 455/500 |
| 2004/0156329 | A1 * | 8/2004 | Bck et al. .................... 370/328 |
| 2004/0235478 | A1 * | 11/2004 | Lindquist et al. ........... 455/440 |

FOREIGN PATENT DOCUMENTS

| WO | 00/32001 | 6/2000 |
| WO | 01/19116 | 3/2001 |
| WO | 01/20806 | 3/2001 |
| WO | 01/76282 | 10/2001 |

OTHER PUBLICATIONS

International Search Report PCT/SE03/00695.
International Preliminary Examination Report dated Mar. 16, 2004.

* cited by examiner

*Primary Examiner*—Temica M. Beamer
*Assistant Examiner*—Anthony S. Addy
(74) *Attorney, Agent, or Firm*—Nixon & Vanderhye P.C.

(57) ABSTRACT

Management information is determined for both non-drifting and drifting mobile radios being serviced by a cell and/or by an RNC and reported to a management system for further processing. A distribution of drifting mobile radios to non-drifting mobile radios in a particular cell (or for all cells controlled by another RNC) is determined using the number of established radio links in the cell (or cells) for both drifting and non-drifting mobile radios. The distribution along with management information detected for non-drifting mobile radios are used to estimate corresponding management information for drifting mobile radios. In this way, management information for both drifting and non-drifting mobile radios is reported to the management system using existing formats, protocols, and procedures in both the traffic and management systems.

37 Claims, 6 Drawing Sheets

NDUE = Non-drifting User Equipment
DUE = Drifting User Equipment

METHOD AND APPARATUS FOR GENERATING MANAGEMENT DATA FOR DRIFTING MOBILE RADIOS

FIELD OF THE INVENTION

The present invention relates to mobile telecommunications, and particularly, to gathering and reporting management-related information pertaining to mobile radios to a management system for a radio network

BACKGROUND AND SUMMARY OF THE INVENTION

In a typical cellular radio system, "wireless" user equipment units (UEs) and one or more "core" networks (like the public telephone network or Internet) communicate via a radio access network (RAN). The UEs very often are mobile, e.g., cellular telephones and laptops with mobile radio communication capabilities (mobile terminals). UEs and the core networks communicate both voice and data information via the radio access network.

The radio access network services a geographical area which is divided into cell areas, with each cell area being served by a base station (BS). Thus, a base station can serve one or multiple cells. A cell is a geographical area where radio coverage is provided by the radio base station equipment at a base station site. Each cell is identified by a unique identity, which is broadcast in the cell. Base stations communicate over a radio or "air" interface with the user equipment units. In the radio access network, one or more base stations are typically connected (e.g., by landlines or microwave links) to a radio network controller (RNC). The radio network controller, also sometimes termed a base station controller (BSC), supervises and coordinates various activities of its base stations. In turn, the radio network controllers are typically coupled together and coupled to one or more core network service nodes which interface with one or more core networks.

One example of a radio access network is the Universal Mobile Telecommunications System (UMTS) Terrestrial Radio Access Network (UTRAN). The UTRAN is a third generation system which in some respects builds upon the radio access technology known as Global System for Mobile communications (GSM) developed in Europe. URAN is a wideband code division multiple access (W-CDMA) system.

A goal of the Third Generation Partnership Project (3GPP) is to evolve further the UTRAN and GSM-based radio access network technologies. Of particular interest here is the support of variable transmission rate services in the third generation mobile radio communications system for both real time and non-real time services. Of course, since all users share the same radio resources, the radio access network must carefully allocate resources to individual UE connections based on quality of service requirements, such as variable rate services, and on the availability of radio resources. When a core network desires to communicate with a UE, it requests services from the radio access network in the form of radio access bearers (RABs) with a particular quality of service (QoS). Quality of service includes such things as data rates, speed, variability of data rate, amount and variability of delay, guaranteed versus best effort delivery, error rate, etc. A radio access bearer is a logical channel or connection through the UTRAN and over the radio interface corresponding to a single data stream. For example, one bearer carries a speech connection, another bearer carries a video connection, and a third bearer carries a packet data connection. Connections are mapped by the UTRAN onto physical transport channels. By providing radio access bearer services to the core network, the UTRAN isolates the core network from the details of radio resource handling, radio channel allocations, and radio control, e.g., soft handover. For simplicity, the term "connection" is used hereafter.

If during the lifetime of the connection, the UE moves to a cell controlled by another RNC, (referred to as a drift RNC (DRNC)), then the RNC that was initially set up to handle the connection for the UE, (referred to as the serving RNC (SRNC)), must request radio resources for the connection from the drift RNC over an Iur interface. If that request is granted, a transmission path is established for the connection between the SRNC and the DRNC to the UE through a base station controlled by the DRNC. A UE whose connection has been handed over from a SRNC to a DRNC is referred to as a drifting UE (DUE). In contrast, when the UE connection is currently serviced by a cell under the control of the SRNC, such a UE is referred to as a non-drifting UE (NDUE).

In most networks, it is desirable to monitor the performance of the network by gathering various statistics, measurements, and other data from the network, processing it, and generating some sort of performance report. Of course, performance can be measured in a variety of ways. Some examples include measuring or determining the volume of traffic, number of attempted, successful, and/or failed connections, number of attempted, successful, and/or failed radio link additions and/or deletions per cell, power levels, interference levels, lost calls, congestion statistics, call setup and tear down times, heavy and light use time frames, number of attempted, successful, and/or failed handovers (hard or inter-radio access technology), etc.

In order to generate these kinds of performance management statistics, the network management system requires measurements and other data to be provided from the network. That information typically must be formatted and communicated using a format and protocol understood by the management system. In modern communication networks, management/statistics functions are performed using a managed information model that is based on managed objects. Observations of the instances of each managed object are stored in a management information database and then provided, typically as a file, to the management system. Performance information for UE-related functions are often specified to be measured and reported per cell.

The management system typically employs formatting and identification schemes that are not the same as those used in the radio access network. For example, each managed object in the management system may be identified by a local distinguished name (LDN) or other managed object identifier. In order to identify a particular object, such as a particular cell, the LDN for that cell or other object identifier must be known. Unfortunately, managed object identifiers, like LDNs, are only used by the management system, and not by the radio access network such as a UTRAN. In a UTRAN, for example, information is identified using cell identifiers and UE identifiers, and not by using managed object identifiers like LDNs. Thus, when an RNC is to report to the management system a particular observation, e.g., maximum allowed downlink power, for a particular managed object cell controlled by that RNC, the observation value is sent along with the LDN for that cell. This information is in a format that can be understood by the management system.

Cells controlled by other RNCs have different managed object identifiers. When a connection is handed over from a serving RNC to a drift RNC, the serving RNC is still in control of the handed-over connection and is the only RNC aware of certain procedures regarding the UE. The drift RNC is a "dumb" node and simply provides radio resources for that connection without having any control of the drifting UE that is now being serviced by one of its cells. In other words, one of the cells in the DRNC's area is servicing a drifting UE connection, but the drift RNC is not aware of everything that happens to it, and therefore, will not be able to report all drifting UE information to the network management system. The serving RNC also cannot report such drifting UE information (that is not known in the drift RNC) to the management system because the cells controlled by the drift RNC area are identified with a managed object identifier that is not known in the serving RNC. Only the drift RNC can report information about managed objects within its control. However, the drift RNC is not "aware" of everything that happens to drifting UEs whose connections are controlled by another RNC.

Although RNCs communicate traffic information to each other, they do not communicate management information to each other. As a result, an RNC is only aware of its own LDN and the LDNs of its underlying managed objects, e.g., its cells. The RNC is not aware of the LDNs of other RNCs or their managed objects. One way of overcoming this problem is to introduce additional control signaling between RNCs for management purposes. For example, when a connection is handed over from a serving RNC to a drift RNC, the serving RNC would send, in addition to the handover traffic information, information, like service type and handover result, which could be used to monitor performance in drifting RNC cells. With this management information, the drift RNC becomes an "intelligent" node capable of reporting management information for the drifting UE. A disadvantage of this approach is that it requires increased signaling between RNCs and a reworking of the RNC Iur interface.

A second solution is for each drift RNC to broadcast management information about all of its managed objects to serving RNCs. Each serving RNC stores and updates managed object information for all cells for all other RNCs. However, this large amount of management information exchange, storage, and data processing is undesirable.

A third approach is to report management information using radio network-type identifiers such as cell identifiers and RNC identifiers. The serving RNC is aware when a connection is handed over to a particular cell associated with a particular RNC. The serving RNC provides this information to the management system using the radio traffic-based identification format. A downside with this approach is that the management system must translate the radio traffic-based information and identifiers into management-based information and identifiers to comply with standards and align to other management functions.

The above approaches require modification of existing management/performance reporting formats, protocols, and procedures as well as additional signaling and/or processing load. The present invention offers a better solution that works within current system frameworks and does not increase signaling and processing burdens. The level of drifting UEs in a particular cell is determined based on established radio links in the cell. Existing management information for non-drifting UEs is used to estimate similar information for drifting UEs using the determined level of drifting UEs. Management information for both drifting and non-drifting UEs is reported to the management system using existing management system formats, protocols, and procedures.

In the context of a cellular radio communications system that includes a first radio network controller (RNC) coupled to several first cells, the first RNC performs a number of procedures in order to report management information for drifting mobile radios in the first cells coupled to the first RNC. Drifting mobile radios having connections handed over to one of the first cells are monitored. Management information for drifting mobile radios in the one cell is determined and reported to a management node or system. One example way of determining management information for drifting mobile radios is to determine a percentage of radio links established for non-drifting mobiles relative to the number of radio links established for drifting mobiles in a particular cell. That percentage is used to scale the non-drifting UE management information to estimate corresponding drifting UE management information. Both sets of information are provided to the management node so that both drifting mobile radios and non-drifting mobile radios in a cell are taken into account in management statistics and analysis.

The reporting may be performed using an existing management protocol over a management protocol interface between the first RNC and the management node. If the management protocol uses managed objects, each managed object may be identified in the management protocol using a Local Distinguishing Name (LDN). If each cell is a managed object having a corresponding LDN, a report to the management node includes an LDN for the managed object cell. If each RNC is a managed object having a corresponding LDN, the report to the management node includes an LDN for a managed object RNC.

BRIEF DESCRIPTION OF THE DRAWINGS

The foregoing and other objects, features, and advantages of the present invention maybe more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is described in an example application to a UMTS type system, the present invention may be employed in any cellular radio system where management of drifting UEs is desired.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
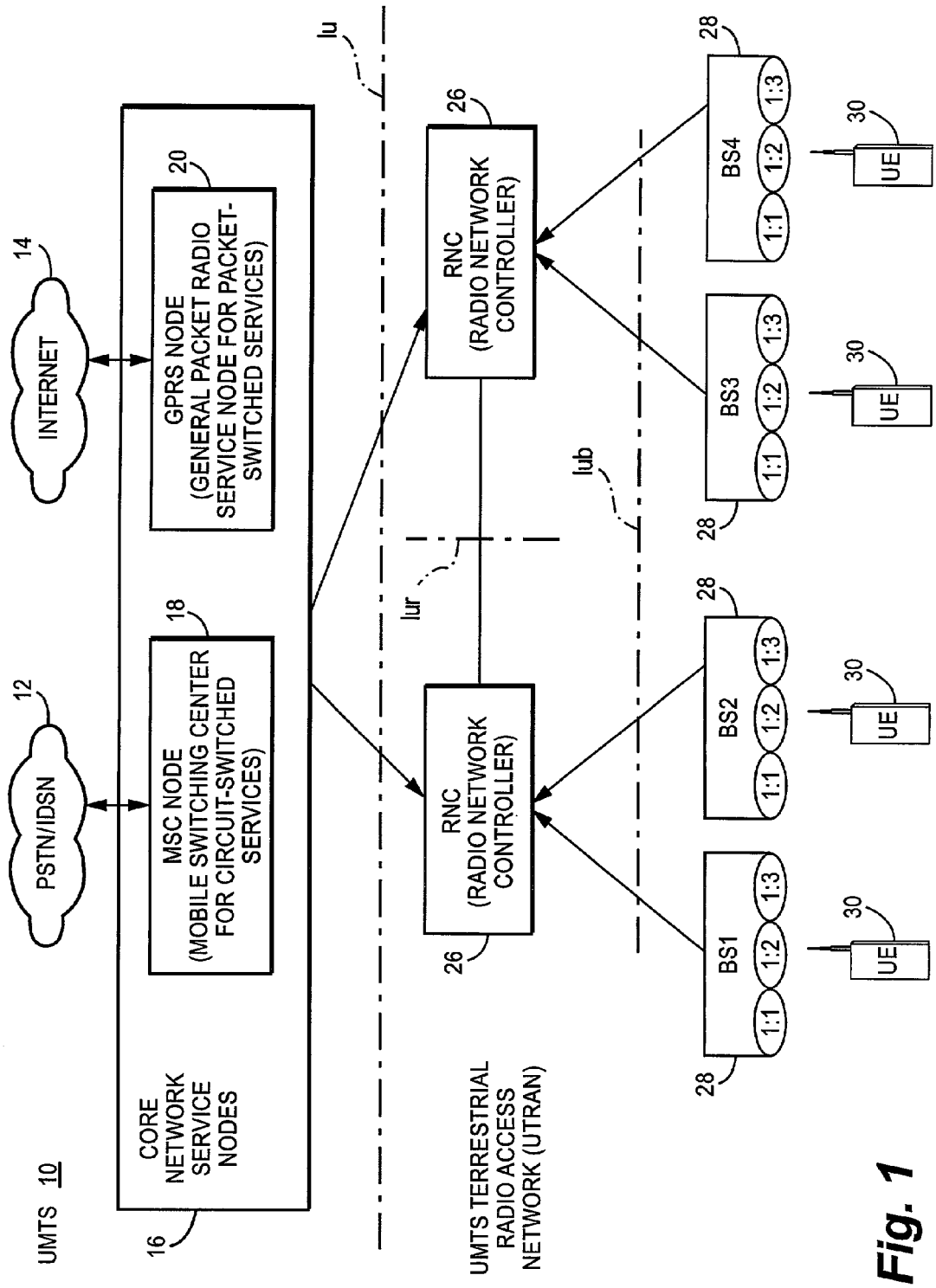
FIG. 1 is a function block diagram illustrating an example mobile radio communications system in which the present invention may be employed.

The present invention is described in the non-limiting, example context of a Universal Mobile Telecommunications System (UMTS) 10 shown in FIG. 1. A representative, connection-oriented, external core network, shown as a cloud 12 may be, for example, the Public Switched Telephone Network (PSTN) and/or the Integrated Services Digital Network (ISDN). A representative, connectionless-oriented external core network shown as a cloud 14, may be for example the Internet. Both core networks are coupled to corresponding core network service nodes 16. The PSTN/ISDN network 12 is connected to a connection-oriented service node shown as a Mobile Switching Center (MSC) node 1 that provides circuit-switched services. The Internet network 14 is connected to a General Packet Radio Service (GPRS) node 20 tailored to provide packet-switched type services which is sometimes referred to as the serving GPRS service node (SGSN).

Each of the core network service nodes 18 and 20 communicate with a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes. Each RNC 26 communicates with a plurality of base stations (BS) 28 BS1–BS4 over the Iub interface. For example, and again for sake of simplicity, two base station nodes are shown connected to each RNC 26. It will be appreciated that a different number of base stations can be served by each RNC, and that RNCs need not serve the same number of base stations. Moreover, FIG. 1 shows that an RNC can be communicated over an Iur interface to one or more RNCs in the URAN 24. A user equipment unit (UE), such as a user equipment unit (UE) 30 shown in FIG. 1, communicates with one or more base stations (BS) 28 over a radio or air interface 32. Each of the radio interface 32, the Iu interface, the Iub interface, and the Iur interface are shown by dash-dotted lines in FIG. 1.

Preferably, radio access is based upon Wideband Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment as well as for the user equipment to identify transmissions from the base station intended for that user equipment from all of the other transmissions and noise present in the same area.

With respect to a certain RAN-UE connection, an RNC can have the role of a serving RNC (SRNC) or the role of a drift RNC (DRNC). If an RNC is a serving RNC, the RNC is in charge of the connection with the user equipment unit and has full control of the connection within the radio access network (RAN). A serving RNC interfaces with the core network for the connection. On the other hand, if an RNC is a drift RNC, it supports the serving RNC by supplying radio resources (within the cells controlled by the drift RNC) needed for a connection with the user equipment.

When a connection between the radio access network and user equipment is being established, the RNC that controls the cell where the user equipment (UE) is located when the connection is established is the serving RNC. As the user equipment moves, the connection is maintained by establishing radio communication branches or legs, often called "radio links", via new cells which may be controlled by other RNCs. Those other RNCs become drift RNCs for the connection.

Figure 2:
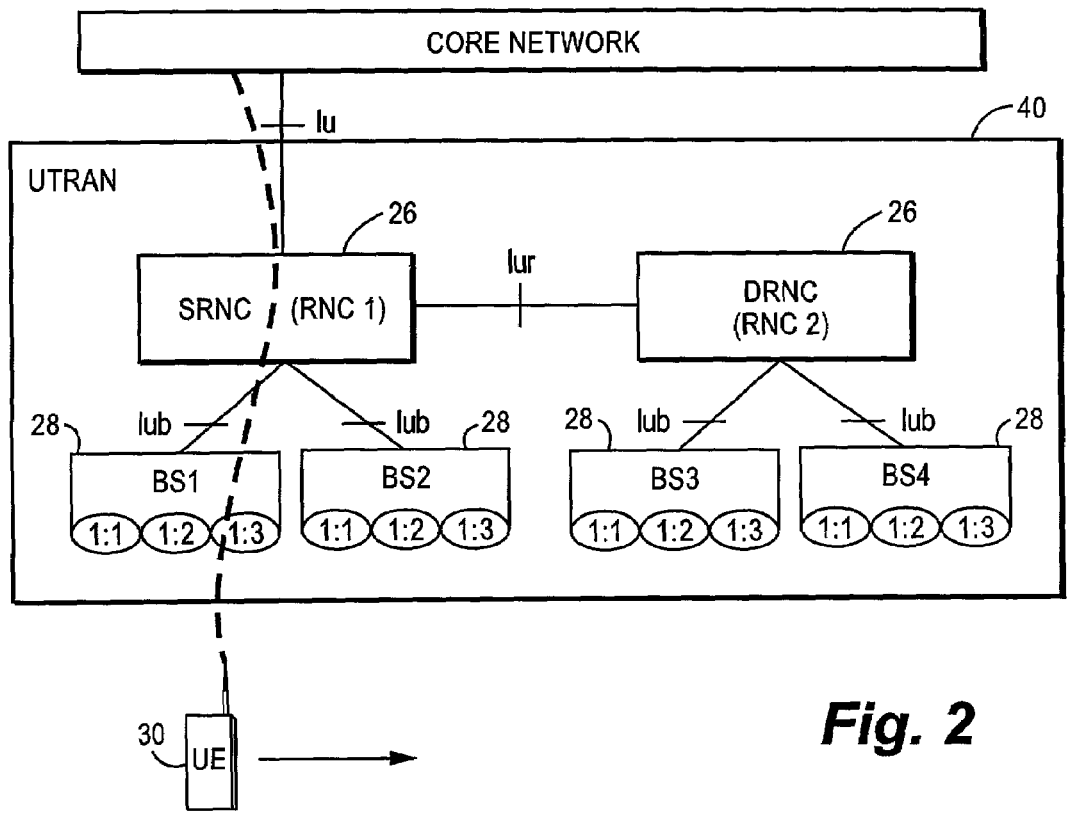
FIG. 2 illustrates establishing a connection from a core network to a user equipment through a serving RNC.

To illustrate the foregoing, and as a prelude to an explanation of the present invention, reference is made to the situation shown in FIG. 2. FIG. 2 shows an example of RNC role assignment for user equipment 30 at initial setup of a connection involving user equipment 30. In FIG. 2, radio network controller RNC1 26 acts as the serving RNC for the connection with user equipment 30, located in cell 3 controlled by base station BS1. The connection with user equipment 30 in FIG. 2 is shown by a broken line which extends from core network 16, through radio network controller RNC1, base station BS1, and a BS1's cell 3 to user equipment 30.

Figure 3:
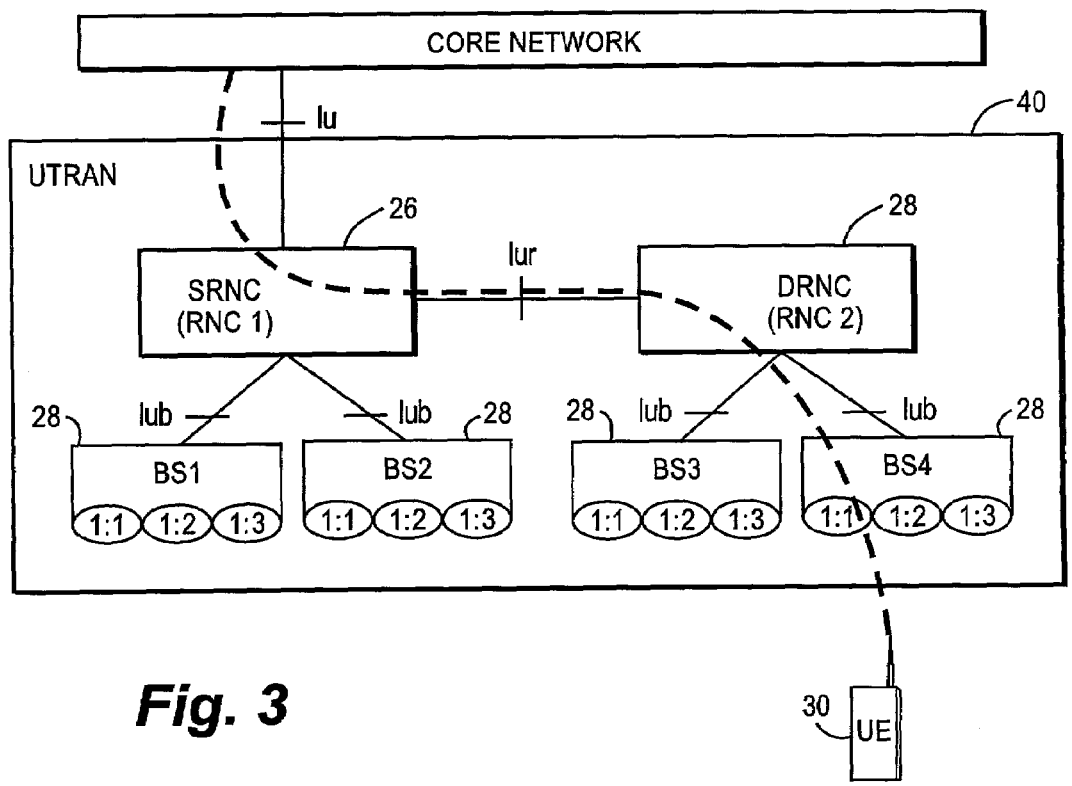
FIG. 3 illustrates a situation where, because of movement of the user equipment, the connection is supported by both a serving RNC and a drift RNC.

Suppose that user equipment 30 travels to the right as indicated by an arrow in FIG. 2, eventually leaving the cell 3 controlled by base station BS1 and traveling successively through the cells controlled by respective base stations BS2 and BS3. As user equipment unit 30 enters a new cell, a handover occurs. FIG. 3 shows user equipment 30 arriving at the cell 1 controlled by base station BS4. Radio network controller 1 still acts as the serving RNC for the connection to user equipment 30, and radio network controller RNC2 acts as the drift RNC. In other words, serving RNC1 controls the connection with user equipment 30, while drift RNC2 supplies resources for the connection with respect to cell 1. The connection is again shown by the broken line.

Figure 4:
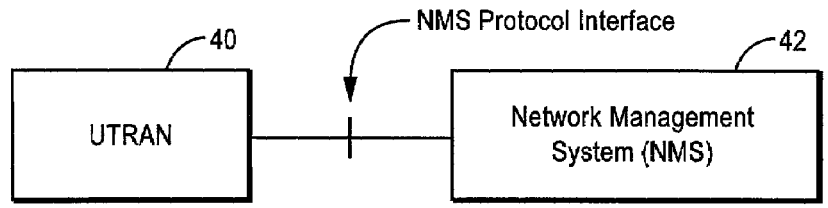
FIG. 4 illustrates a UTRAN coupled to a network management system.

As described above, when a UE moves to cells controlled by a drift RNC, the serving RNC needs to request resources for this UE from the drift RNC over the Iur interface. The drift RNC allocates certain types of resources for the cell in question such as interference and power resources. The drift RNC also requests the appropriate radio base station to allocate resources internal to the base station needed to support the connection. Also, as explained in the background, radio networks are typically coupled to network management systems. FIG. 4 shows a UTRAN 40 coupled to a Network Management System (NMS) 42 via an NMS protocol interface. The NMS protocol interface typically uses a different entity identification/addressing paradigm and protocol than that used in the UTRAN 40. As a result, the UTRAN employs a particular file format for reporting management information from the UTRAN 40 to the NMS 42, that format being described in 3GPP Technical Specification (TS) 32.401.

Figure 5:
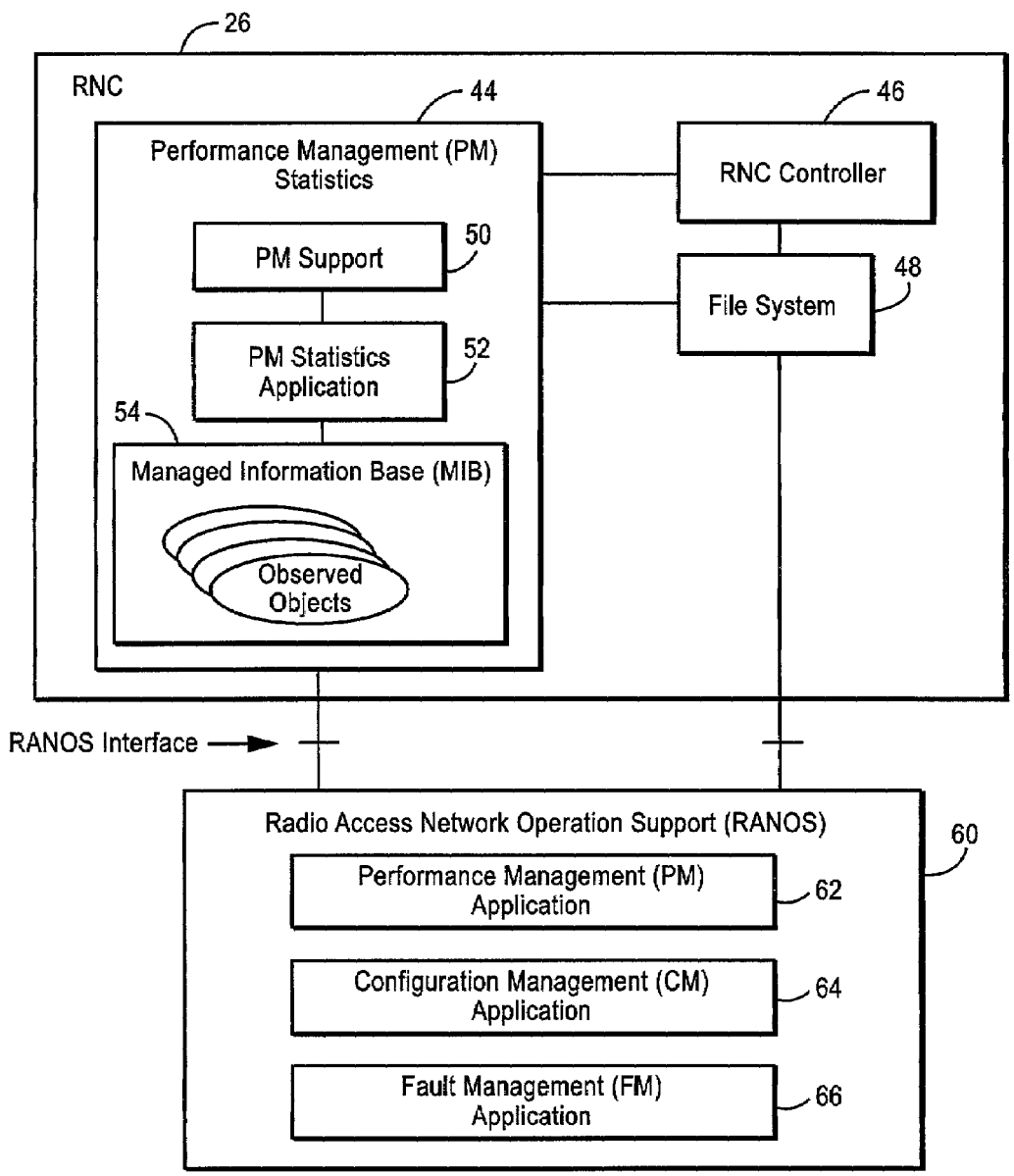
FIG. 5 illustrates in function block diagram performance management support entities in an RNC coupled to a Radio Access Network Operation Support (RANOS) node.

A more specific, but non-limiting UTRAN-based example is shown in FIG. 5. An RNC 26 reports to a network management system 42, in this case a Radio Access Network Operation Support (RANOS) node 60 over a RANOS interface. The RNC 26 includes a Performance Management (PM) statistics entity 44 coupled to a file system 48. The performance management statistics entity 44 includes a performance management support 50, a performance management statistics application 52 and is coupled to a managed information base (MIB) 54 that includes parameter values observed for various managed objects monitored by the RNC. The RANOS node 60 includes a performance management application 62, a configuration management application 64, and a fault management application 66. The present invention relates to the performance management application 62. The managed object model or paradigm is standardized by 3GPP at TS 32.642.

The performance management interface between RANOS 60 and the PM statistics function 44 is used to set up performance monitorings. One way is to define particular counters to collect statistical data having counter names connected to MO classes or instances of MO classes. In this case, the LDNs in the MIB 54 are used. The interface is used to fetch the files containing the statistics produced in the RNC. The data in these files refer to objects in the MIB and includes integer values each connected to a counter name and a LDN that is part of the MIB 54.

Figure 6:
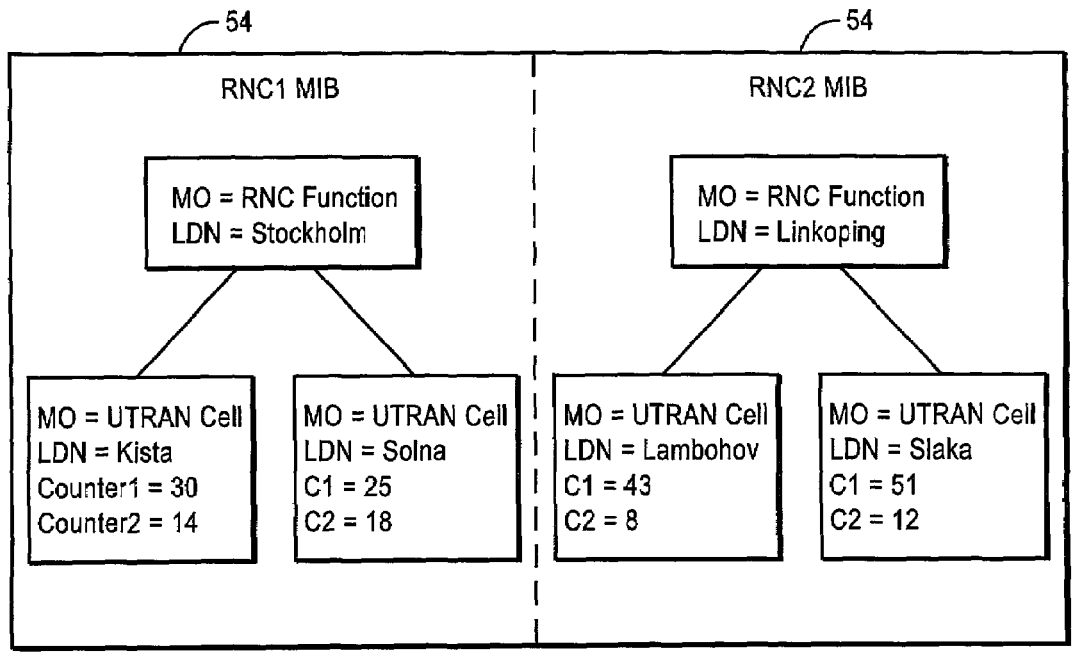
FIG. 6 is a simplified illustration of managed objects in two RNC Management Information Bases (MIBs)

An example of managed objects in two RNC management information bases (MIBs) is shown in FIG. 6. For RNC1's MIB 54, an RNC function corresponds to a Managed Object (MO) and is associated with a Local Distinguishing Name (LDN) identifier corresponding to the city Stockholm. The Stockholm RNC is coupled to two cells which correspond to two managed objects, each labeled as UTRAN Cell. UTRAN Cells are distinguished by the RNC Stockholm using a corresponding managed object LDN: one cell is named after the city Kista and the other an LDN named after the city Solna. Associated with the managed object UTRAN Cells are counters C1 and C2 used to monitor events and/or other activities that occur in that cell. The C1 and C2 count values are "attributes" of the managed object cell. One example of a counter at a cell level is "attempted radio link additions to active link set." Another example is a cell relation counter such as "attempted outgoing hard handovers," between radio base stations coupled to the same RNC. Similarly, the second RNC2's MIB 54 corresponds to an RNC function managed object that is distinguished from the Stockholm managed object by an LDN corresponding to the city Linköping. The Linköping RNC managed object is coupled to two UTRAN Cell managed objects having LDNs corresponding to the cities Lambohov and Slaka. Example counters C1 and C2 are also shown for both of these cell managed objects.

In this simple example, only RNC1 is aware of the LDNs corresponding to the RNC Stockholm and its cells Kista and Solna. Similarly, only RNC2 is aware of the LDNs corresponding to the RNC Linköping and its cells Lambohov and Slaka. As a result, only RNC1 with an LDN corresponding to Stockholm can report management information for the cells having an LDN corresponding to Kista and an LDN corresponding to Solna. Similarly, only RNC2 with an LDN corresponding to Linköping can report management information (e.g., counter values) for cells identified by LDNs corresponding to the cells Lambohov and Slaka.

Other examples of management information that may be monitored using counters include: a number of attempted hard handovers per cell relation, a number of successful hard handovers per cell relation, a number of failed hard handovers per cell relation, a number of attempted radio link delections per cell, a number of successful radio link delections per cell, a number of failed radio link delections per cell, a number of attempted radio link additions per cell, a number of successful radio link additions per cell, a number of failed radio link additions per cell, a number of attempted outgoing inter-radio access technology handovers for circuit-switched calls per cell relation, a number of successful outgoing inter-radio access technology handovers for circuit-switched calls per cell relation, a number of failed outgoing inter-radio access technology handovers for circuit-switched calls per cell relation, a number of attempted outgoing inter-radio access technology handovers for packet-switched calls per cell relation, a number of successful outgoing inter-radio access technology handovers for packet-switched calls per cell relation, and a number of failed outgoing inter-radio access technology handovers for packet-switched calls per cell relation.

Figure 7:
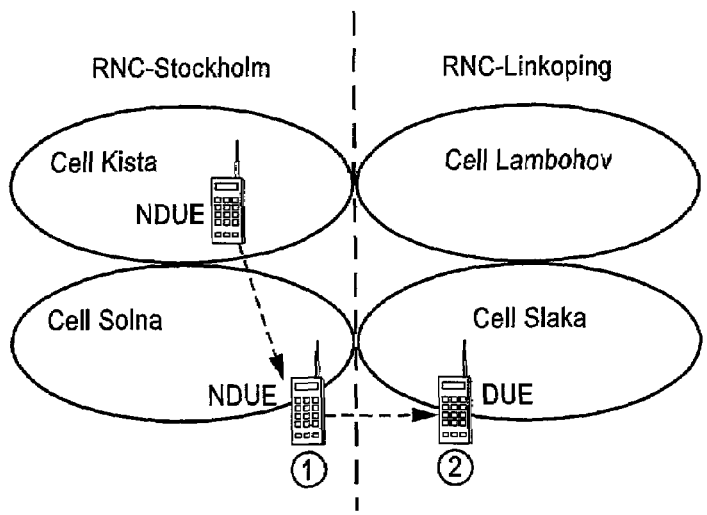
FIG. 7 shows an example of non-drifting and drifting mobiles in the example of FIG. 6.

FIG. 7 illustrates a management information reporting scenario where a User Equipment (UE) establishes a connection in cell Kista under the control of RNC Stockholm. As the UE moves to an adjacent cell Solna, it is still under the control of RNC Stockholm. Accordingly, in both cells Kista and Solna the UE is a Non-Drifting User Equipment (NDUE). Therefore, RNC Stockholm is able to report management information (e.g., counter values) for that connection in both cell Kista and in cell Solna. When the UE connection is handed over to cell Slaka controlled by RNC Linköping, it is now a Drifting User Equipment (DUE). The serving RNC, in this case RNC Stockholm, controls this connection.

Assume that at this point an event occurs for the drifting UE in cell Slaka which would otherwise increment a management attribute counter if cell Slaka were coupled to RNC Stockholm. RNC Stockholm does not know the LDN of cell Slaka. The LDN of cell Slaka is necessary in order to report a counter value associated with the drifting UE in cell Slaka to a management node. As a result, management information is only reported for non-drifting UEs. Even though the drift RNC, here RNC Linköping, knows the LDN for cell Slaka, it is unaware of most events affecting or related to the drifting UE in cell Slaka, even though it is providing radio resources for that handed-over connection. Thus, when the non-drifting UE reaches location (1) in FIG. 7, there is an attempt to set up a radio link in cell Solna, and a counter corresponding to "attempted radio link additions to active link set" is incremented. When the now drifting UE reaches location (2), there is an attempt to set up a radio link in cell Slaka, and therefore the same counter "attempted radio link additions to active link" in cell Slaka should also be incremented. However, because RNC Stockholm is the only RNC that knows about this radio link addition attempt, the cell Slaka attribute counter is not incremented because the LDN of cell Slaka is not known in RNC Stockholm.

The present invention overcomes these difficulties and permits RNCs to report management information events for both non-drifting and drifting UEs. Radio links established in a cell are a measure of load in that cell. The cell's RNC knows which radio links are established for drifting UEs and which radio links are established for non-drifting UEs. The numbers of the established radio links for DUEs and NDUEs are used to establish a ratio/percentage. The ratio/percentage is used to scale management information, e.g., attribute values, measured by the RNC for non-drifting UEs to estimate corresponding management information for drifting UEs. In other words, by comparing the number of radio links established for drifting UEs and the number of radio links established for non-drifting UEs, a distribution of drifting UEs relative to non-drifting UEs can be established. Drifting UE management information is calculated using the distribution and non-drifting UE management data.

Figure 8:
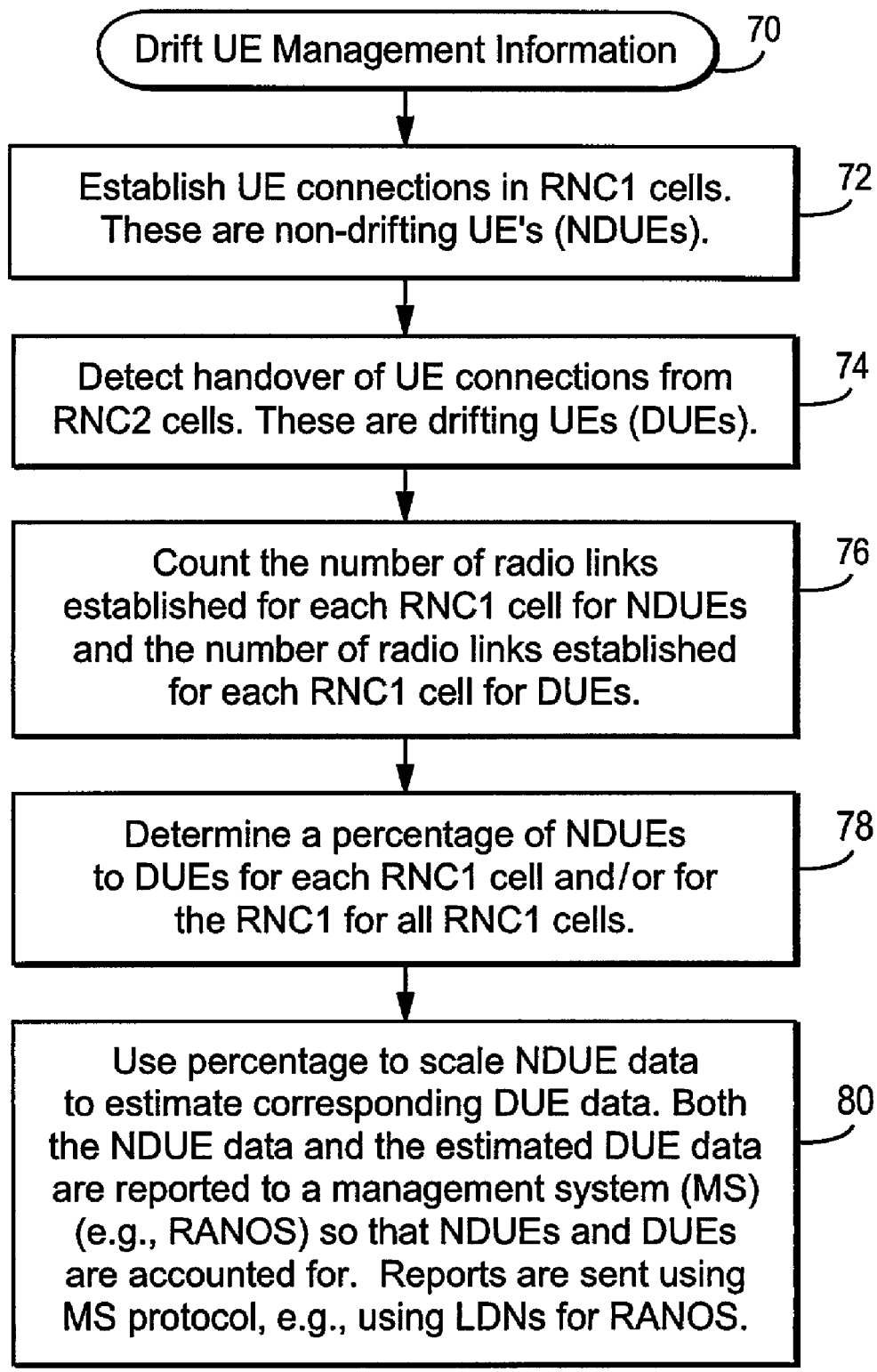
FIG. 8 is a flowchart diagram illustrating drift UE management information gathering procedures in accordance with one example embodiment of the present invention.

Reference is made to a Drift UE Management Information routine (block 70) shown in flowchart form in FIG. 8. UE connections are established in cells coupled to a first RNC (RNC 1). The UEs in these connections are non-drifting UEs (NDUEs) (block 72). One or more handovers of UE connections is detected from one or more cells from a second RNC (RNC 2) (block 74). The UEs in the handed-over connections are referred to as drifting UEs (DUEs). The RNC 1 counts a number of radio links established in each RNC 1 cell for non-drifting UEs and a number of radio links established in each RNC 1 cell for drifting UEs (block 76). A percentage or ratio is determined that relates non-drifting UEs to drifting UEs based on the number of radio links established/counted for non-drifting UEs and drifting UEs (block 78). The percentage may be determined for an individual RNC 1 cell. That percentage is used to scale UE management information measured or detected for NDUEs to estimate corresponding DUE management data. Both the NDUE management data and the estimated DUE management data are reported to the management system, e.g., RANOS. In this way, events related to non-drifting UEs and drifting UEs are accounted for in the management data report (block 80). Significantly, the report may be sent using an existing management system paradigm/protocol, e.g., using LDNs if the management system is RANOS.

Figure 9:
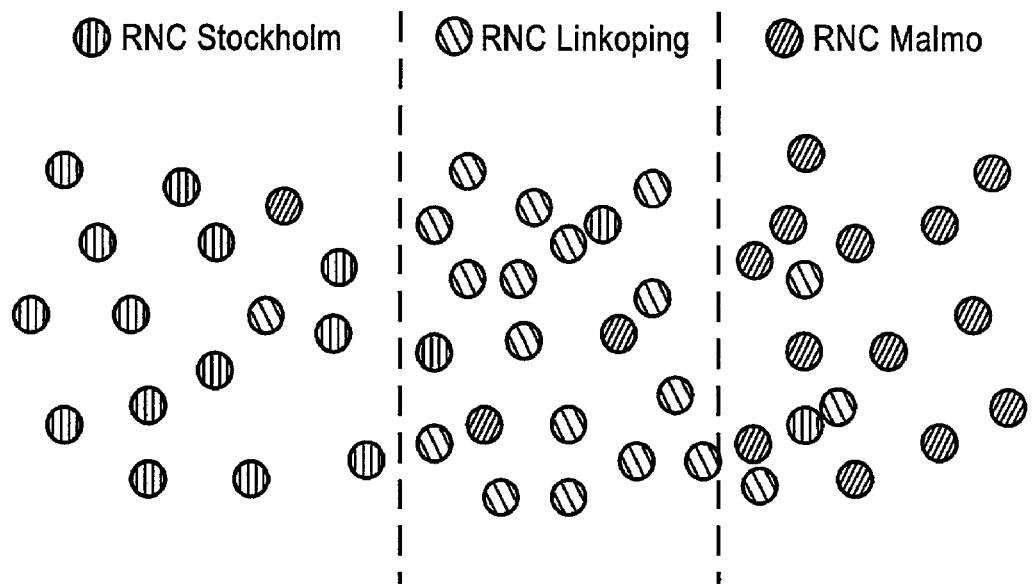
FIGS. 9 and 10 show further examples of drifting and non-drifting mobiles for three different RNCs.
Figure 10:
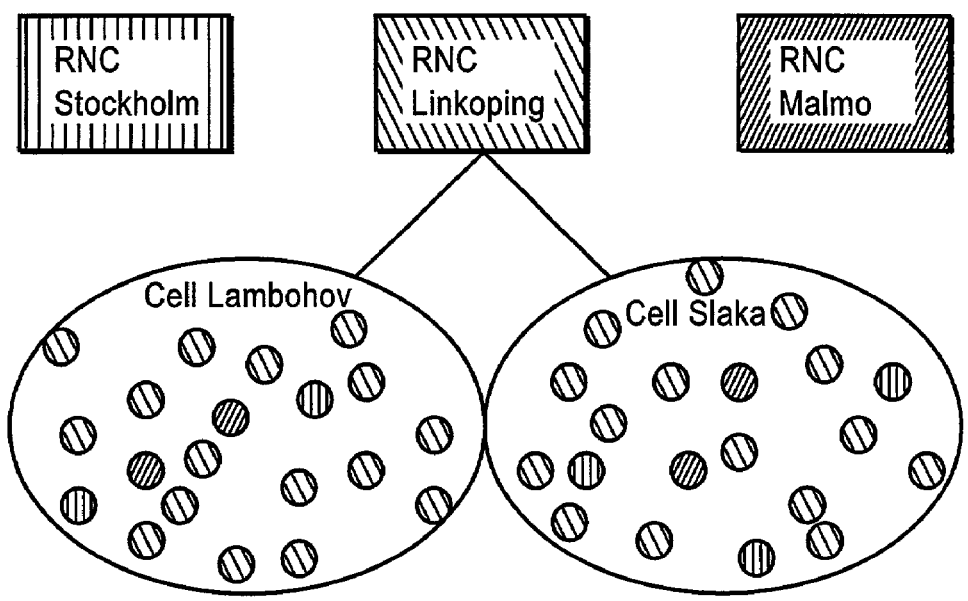

Two examples are now provided for developing statistics for drifting UEs at an RNC level (FIG. 9) and at a cell level (FIG. 10). In FIG. 9, there are three RNCs: Stockholm, Linköping, and Malmö corresponding to three cities in Sweden. Each RNC is coupled to its own multiple base station cells (not shown). UEs that are served by RNC Stockholm are shown as vertically-hatched circles. UEs that are served by RNC Linköping are shown as left-hatched circles, and UEs served by RNC Malmö are shown as right-hatched circles. RNC Stockholm serves one UE that is drifting in RNC Malmö and two UEs that are drifting in RNC Linköping. The drifting UE management information at the RNC level may be determined as follows for RNC Stockholm. Assume only one radio link is established by each UE in this simplified example where MO=managed object, Iur is the interface between RNCs, and RL=radio link.

MO RNC function, LDN=Stockholm: number of RLs established=14 (this is the sum of RLs established for NDUEs of all cells in this RNC).

MO Iur link, LDN=Linköping: number of RLs established=2 (this is the sum of RLs established in RNC Linköping for UEs served by RNC Stockholm).

MO Iur link, LDN=Malmö: number of RLs established=1 (this is the sum of RLs established in RNC Malmö for UEs served by RNC Stockholm).

The managed object Iur link is used to configure data for other RNCs in the UTRAN and is also used to connect performance data related to the other RNCs in UTRAN. These example statistics show that (1+2)/(14+1+2)=18% of the UEs served by RNC Stockholm have drifted out from the Stockholm area and that 2/3=67% of those drifting UEs have moved into the Linköping area and the rest to the Malmö area.

A simple example at the cell level is illustrated in FIG. 10. RNC Linköping is coupled to cell Lambohov and cell Slaka. Although most of the UEs in these cells are non-drifting UEs, there are a few drifting UEs from RNC Stockholm and RNC Malmö. In this example, the drifting UE data on a cell level can be determined as follows assuming only one radio link is used by each UE:

MO UTRAN, LDN = Lambohov: number of ratio links established by drifting UEs = 4
number of radio links established by non-drifting UEs = 16
MO UTRAN cell, LDN = Slaka: number of radio links established by drifting UEs = 5
number of radio links established by non-drifting UEs = 15

Using a ratio of drifting UEs to non-drifting UEs in a cell, 4:16 in Lambohov and 5:15 in Slaka, parameters that can only be measured for non-drifting UEs can be estimated for drifting UEs. For example, a parameter counter "attempted radio link additions to active link set" can only be reported for non-drifting UEs equals 40 for cell Lambohov. The drifting UE distribution in cell Lambohov based on number of established radio links corresponds to the ratio/percentage of drifting UEs (DUEs) to non-drifting UEs (NDUEs), 4/16 or 0.25. The parameter count value of 40 for NDUE may be multiplied by 1.25 (1+4/16) to provide a calculated total number of attempted radio link additions in cell Lambohov of 50. A similar counter value for cell Slaka would be multiplied by 1.33 (1+5/15). Using these ratios/percentages, management data for both DUEs and NDUEs may be determined and reported. The management system may then take both DUEs and NDUEs into account when determining performance measures, statistical trends, etc. for the UTRAN, individual RNCs, and individual cells.

The present invention permits management information relating to drifting UEs to be provided in an efficient manner to a management system. No additional control signaling is required between RNCs. Nor do existing RNCs and network management systems have to be modified in order to understand the format and protocol of the other.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. For use in a cellular radio communications system including a first radio network controller (RNC) controlling a first set of cells, a method performed by the first RNC comprising:

establishing a first connection between a first mobile radio and the first RNC through one of the first set of cells;

detecting a handover of a second connection involving a second mobile radio moving from a cell in a second set of cells controlled by a second RNC to the one cell; and wherein the first mobile radio being currently served by the one cell controlled by the first RNC corresponds to a non-drifting mobile radio and the second mobile radio, whose second connection has been handed over from a cell controlled by the second RNC to a cell controlled by the first RNC, corresponds to a drifting mobile radio after the handover, and wherein the second connection is still controlled by the second RNC after the handover, the first RNC determining first management information for the non-drifting mobile radio in the first cell;

the first RNC estimating second management information for the drifting mobile radio based on the first management information for the non-drifting mobile radio in the first cell using information associated with a number of drifting mobile radio connections in the first cell and a number of non-drifting mobile radio connections in the first cell;

the first RNC providing to a management entity, external to and separate from the first and second RNCs, the first and second management information, wherein the management entity uses the first and second management information from the first RNC to generate management statistics for the cellular radio communications system.

2. The method in claim 1, wherein the RNC provides management information for drifting mobile radios and non-drifting mobile radios located in the one cell.

3. The method in claim 1, further comprising:
counting a first number of radio links established in the one cell for non-drifting mobile radios, and
counting a second number of radio links established in the one cell for drifting mobile radios.

4. The method in claim 3, further comprising:
determining a percentage relating non-drifting mobile radios and drifting mobile radios in the one cell using the first and second numbers.

5. The method in claim 4, further comprising:
using the percentage to estimate management information for drifting mobile radios in the one cell, and
reporting management information for both non-drifting mobile radios and drifting mobile radios in the one cell to the management entity.

6. The method in claim 1, wherein the management information includes one or more of the following: a number of attempted hard handovers per cell relation, a number of successful hard handovers per cell relation, a number of failed hard handovers per cell relation, a number of attempted radio link detections per cell, a number of successful radio link detections per cell, a number of failed radio link detections per cell, a number of attempted radio link additions per cell, a number of successful radio link additions per cell, a number of failed radio link additions per cell, a number of attempted outgoing inter-radio access technology handovers for circuit-switched calls per cell relation, a number of successful outgoing inter-radio access technology handovers for circuit-switched calls per cell relation, a number of failed outgoing inter-radio access technology handovers for circuit-switched calls per cell relation, a number of attempted outgoing inter-radio access technology handovers for packet-switched calls per cell relation, a number of successful outgoing inter-radio access technology handovers for packet-switched calls per cell relation, and a number of failed outgoing inter-radio access technology handovers for packet-switched calls per cell relation.

7. For use in a cellular radio communications system including a first radio network controller (RNC) controlling plural first cells, a method implemented at the first RNC comprising:

monitoring a first number of drifting mobile radios whose connections have been handed over from a second set of cells controlled by a second RNC to one of the first cells, those connections still being controlled by the second RNC after handover;

monitoring a second number of non-drifting mobile radios whose connections are currently being supported by the one cell;

determining non-drifting mobile radio management information for the non-drifting mobile radios;

estimating drifting mobile radio management information for the drifting mobile radios using the non-drifting mobile radio management information and the first and second numbers, and reporting the non-drifting and drifting mobile radio management information to a management node that is external to and separate from the first and second RNCs, wherein the management node uses the non-drifting and drifting management information to generate management statistics for the cellular radio communications system.

8. The method in claim 7, wherein the reporting is performed using a management protocol over a management protocol interface between the first RNC and the management node.

9. The method in claim 8, wherein the management protocol includes managed objects, and each managed object is identified in the management protocol using a local distinguishing name (LDN).

10. The method in claim 9, wherein each cell and cell relation is a managed object having a corresponding LDN, and wherein the report to the management node of the mobile radio management information is generated using an LDN for a managed object corresponding to the one cell.

11. The method in claim 9, wherein the RNC is a managed object having a corresponding LDN, and wherein the report to the management node of the mobile radio management information is generated using an LDN for a managed object corresponding to the RNC.

12. The method in claim 7, wherein the mobile radio management information is determined based on a number of radio links established for the drifting mobile radios and a number of radio links established for the non-drifting mobile radios.

13. For use in a cellular radio communications system including a first radio network controller (RNC) controlling plural first cells, a method comprising:

the first RNC determining a first number of radio links established in one of the first cells for non-drifting mobile radios being controlled by the first RNC, the first RNC determining a second number of radio links established in the one cell for drifting mobile radios whose connections have been handed over from a cell controlled by another RNC to the one cell, where the drifting mobile radio connections are controlled by another RNC, and the first RNC determining cell management information for the one cell that accounts for non-drifting mobile radios and drifting mobile radios having established radio links in the one cell including estimating drifting management information relating to the drifting mobile radios based on non-drifting management information determined for the non-drifting mobile radios, the first RNC providing the cell management information to a management entity for generating management statistics for the cellular radio communications system.

14. The method in claim 13, wherein the management entity is a management node external to and separate from the first and other RNCs.

15. The method in claim 14, wherein the reporting is performed using a management protocol over a management protocol interface between the RNC and the management node.

16. The method in claim 15, wherein the management protocol includes managed objects, and each managed object is identified in the management protocol using a local distinguishing name (LDN).

17. The method in claim 16, wherein each cell and cell relation is a managed object having a corresponding LDN, and wherein the report to the management node of the management information is generated using an LDN for a managed object corresponding to the one cell.

18. The method in claim 16, wherein each RNC is a managed object having a corresponding LDN, and wherein the report to the management node of the cell management information is generated using an LDN for a managed object corresponding to the RNC.

19. For use in a cellular radio communications system including a first radio network controller (RNC) controlling a first set of cells, the first RNC comprising electronic circuitry configured to:
    establish a first connection between a first mobile radio and the first RNC through one of the first set of cells;
    detect a handover of a second connection involving a second mobile radio moving from a cell in a second set of cells controlled by a second RNC to the first cell;
    provide to a management entity external to the first and second RNCs management information for the first mobile radio and the second mobile radio located in the one cell,
    wherein the first mobile radio being currently served by the one cell controlled by the first RNC corresponds to a non-drifting mobile radio and the second mobile radio, whose second connection has been handed over from a cell controlled by the second RNC to a cell controlled by the first RNC, corresponds to a drifting mobile radio after the handover, and wherein the second connection is still controlled by the second RNC after the handover,
    determine first management information for the non-drifting mobile radio in the first cell;
    estimate second management information for the drifting mobile radio based on the first management information for the non-drifting mobile radio in the first cell;
    provide to a management entity, external to and separate from the first and second RNCs, the first and second management information for the first mobile radio and the second mobile radio located in the one first cell,
    wherein the first and second management information from the first RNC is useable by the management entity to generate management statistics for the cellular radio communications system.

20. The RNC in claim 19, wherein the electronic circuitry is configured to: provide management information for drifting mobile radios and non-drifting mobile radios located in the first set of cells.

21. The RNC in claim 20, wherein the electronic circuitry is configured to:
    count a first number of radio links established in the one cell for non-drifting mobile radios, and
    count a second number of radio links established in the one cell for drifting mobile radios.

22. The RNC in claim 21, wherein the electronic circuitry is configured to determine a percentage relating non-drifting mobile radios and drifting mobile radios in the one cell using the first and second numbers.

23. The RNC in claim 22, wherein the electronic circuitry is configured to:
    use the percentage to estimate management information for drifting mobile radios, and
    report management information for both non-drifting mobile radios and drifting mobile radios in the one cell to the management entity.

24. The RNC in claim 19, wherein the management information includes one or more of the following: a number of attempted hard handovers per cell relation, a number of successful hard handovers per cell relation, a number of failed hard handovers per cell relation, a number of attempted radio link detections per cell, a number of successful radio link detections per cell, a number of failed radio link detections per cell, a number of attempted radio link additions per cell, a number of successful radio link additions per cell, a number of failed radio link additions per cell, a number of attempted outgoing inter-radio access technology handovers for circuit-switched calls per cell relation, a number of successful outgoing inter-radio access technology handovers for circuit-switched calls per cell relation, a number of failed outgoing inter-radio access technology handovers for circuit-switched calls per cell relation, a number of attempted outgoing inter-radio access technology handovers for packet-switched calls per cell relation, a number of successful outgoing inter-radio access technology handovers for packet-switched calls per cell relation, and a number of failed outgoing inter-radio access technology handovers for packet-switched calls per cell relation.

25. For use in a cellular radio communications system including a radio network controller controlling plural first cells, the first RNC comprising electronic circuitry configured to:
    monitor a first number of drifting mobile radios whose connections have been handed over from a second set of cells controlled by a second RNC to one of the first cells, those connections still being controlled by the second RNC after handover;
    monitor a second number of non-drifting mobile radios whose connections are currently being supported by the one cell;
    determine non-drifting mobile radio management information for the non-drifting mobile radios; and
    estimating drifting mobile radio management information for the drifting mobile radios using the non-drifting mobile radio management information and the first and second numbers;
    report the non-drifting and drifting mobile radio management information to a management node for generating management statistics for the cellular radio communications system.

26. The RNC in claim 25, wherein the reporting is performed using a management protocol over a management protocol interface between the first RNC and the management node.

27. The RNC in claim 26, wherein the management protocol includes managed objects, and each managed object is identified in the management protocol using a local distinguishing name (LDN).

28. The RNC in claim 27, wherein each cell and cell relation is a managed object having a corresponding LDN, and wherein the report to the management node of the mobile radio management information is generated using an LDN for a managed object corresponding to the one cell.

29. The RNC in claim 27, wherein the RNC is a managed object having a corresponding LDN, and wherein the report to the management node of the mobile radio management information is generated using an LDN for a managed object corresponding to the RNC.

30. The RNC in claim 25, wherein the electronic circuitry is configured to:
monitor a second number of non-drifting mobile radios whose connections are currently being supported by the one cell;
determine the mobile radio management information taking into account the first and second numbers, and
report the mobile radio management information to the management node.

31. The RNC in claim 30, wherein the mobile radio management information is determined based on a number of radio links established for the drifting mobile radios and a number of radio links established for the non-drifting mobile radios.

32. For use in a cellular radio communications system including a first radio network controller (RNC) controlling plural first cells, the RNC comprising electronic circuitry configured to:
determine a first number of radio links established in one of the first cells for non-drifting mobile radios being controlled by the first RNC,
determine a second number of radio links established in the cell for drifting mobile radios whose connections have been handed over from a cell controlled by another RNC to the one cell, where the drifting mobile radio connections are controlled by another RNC,
determine cell management information for the one cell that accounts for non-drifting mobile radios and drifting mobile radios having established radio links in the one cell including estimating drifting management information relating to the drifting mobile radios based on non-drifting management information determined for the non-drifting mobile radios using the first and second numbers, and
provide the cell management information to a management entity for generating management statistics for the cellular radio communications system.

33. The RNC in claim 32,
wherein the management entity is a management node external to and separate from the first and other RNCs.

34. The RNC in claim 33, wherein the reporting is performed using a management protocol over a management protocol interface between the RNC and the management node.

35. The RNC in claim 34, wherein the management protocol includes managed objects, and each managed object is identified in the management protocol using a local distinguishing name (LDN).

36. The RNC in claim 35, wherein each cell and cell relation is a managed object having a corresponding LDN, and wherein the report to the management node of the cell management information is generated using an LDN for a managed object corresponding to the one cell.

37. The RNC in claim 35, wherein each RNC is a managed object having a corresponding LDN, and wherein the report to the management node of the management information is generated using an LDN for a managed object corresponding to the RNC.

* * * * *